Nov. 20, 1928.                                                                    1,691,927
W. E. GLATT ET AL
SHAPER HEAD FOR WOODWORKING MACHINERY
Filed Sept. 28, 1925

Inventors:
William E. Glatt &
Ernest Hermann
by Parker & Carter
Attorneys.

Patented Nov. 20, 1928.

1,691,927

UNITED STATES PATENT OFFICE.

WILLIAM E. GLATT AND ERNST HERMANN, OF CHICAGO, ILLINOIS.

SHAPER HEAD FOR WOODWORKING MACHINERY.

Application filed September 28, 1925. Serial No 58,957.

Our invention relates to a cutting head and rabbet cutter for mouldings and particularly to a head of the type described wherein provision is made for adjustment of the individual cutting elements. One object is the provision of such a head in which the cross section of the moulding cut may be varied by varying the position of the cutting elements. Another object is the provision of such a head in which the angle of the cutting elements may be varied in order to vary the angle or thickness of the moulding. Another object is the provision of rabbet cutting elements axially adjustable on the cutting head. Another object is the provision of a cutting head in which a plurality of longitudinally or axially aligned cutting members may be positioned. Other objects will appear from time to time in the course of the specification and claims.

We illustrate our invention more or less diagrammatically in the accompanying drawings, wherein—

Like parts are illustrated by like symbols throughout the specification and drawings.

A represents a horizontally surfaced table or bed structure for supporting the work. $A^1$ is a work guide projecting upwardly therefrom and herein illustrated as laterally adjustable, for example by the slides $A^2$ slotted as at $A^3$ to engage the securing bolt $A^4$. $A^5$ indicates a piece of moulding about to pass between the guide $A^1$ and the cutter structure. It will be understood that the cutter head is mounted upon any suitable shaft B and held against rotation in relation thereto. We provide any suitable means, not herein shown, for rotating said shaft to give the necessary cutting movement to the cutter.

The cutter head comprises the lower circular plate $B^1$ and the upper circular plate $B^2$, both being centrally apertured to conform to the cross section of the shaft B. They are connected for example by the members $B^3$ $B^3$ which are provided along their inner or plane faces with tongues $B^4$ to engage slots $B^5$ in the upper surface of the plate $B^1$ and the lower surface of the plate $B^2$. We may employ any suitable securing means, for example the screws $B^6$ which pass through said plates into the members $B^3$. The inner flat faces of the members $B^3$ are milled or roughened as at $B^7$ to provide a gripping or holding face. The plates $B^1$ $B^2$ are further grooved or slotted as at C, $C^1$ in order to receive the tongues $C^2$ $C^3$ of the clamp blocks $C^4$. The blocks are made slidable along the slots to permit adjustment. The blocks may be moved from side to side of the shaft B along the grooves C, $C^1$ to permit the cutting tools to be set for reverse action. Thus the cutter may be rotated in either direction. They are fixed against such movement, during use of the cutter head and are positioned in a generally fixed adjustment by the securing of the plates $B^1$ $B^2$ against the spacing members $B^3$. Each block is provided with a gripping member or members, herein shown as a pair of vertically spaced screws D $D^1$ having for example the hexagonal heads $D^2$ or other suitable means for turning them to obtain adequate clamping action against the opposed surface $B^7$.

Figure 1:
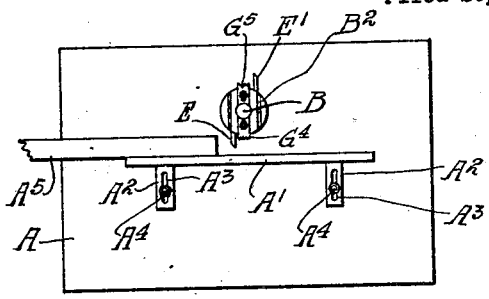
Figure 1 is a plan view illustrating the head in position on the table across which the mouldings are moved.
Figure 4:
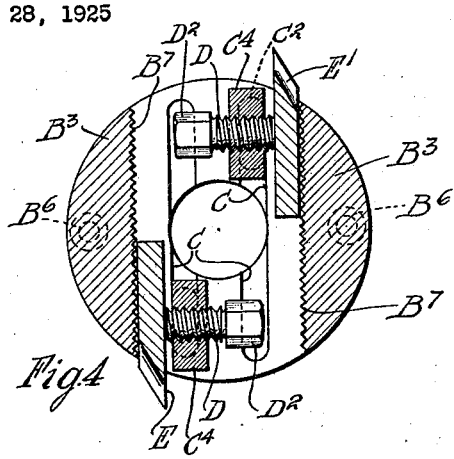
Figure 4 is a section on the line 4—4 of Figure 3.
Figure 2:
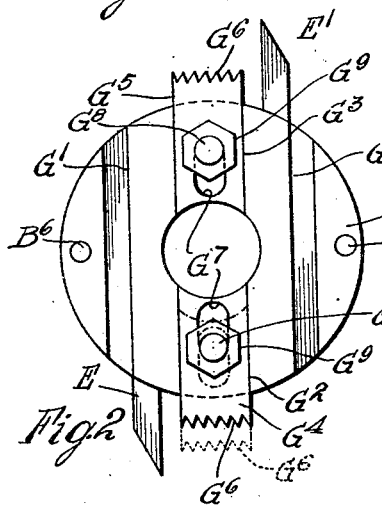
Figure 2 is a plan view of the head on an enlarged scale.
Figure 5:
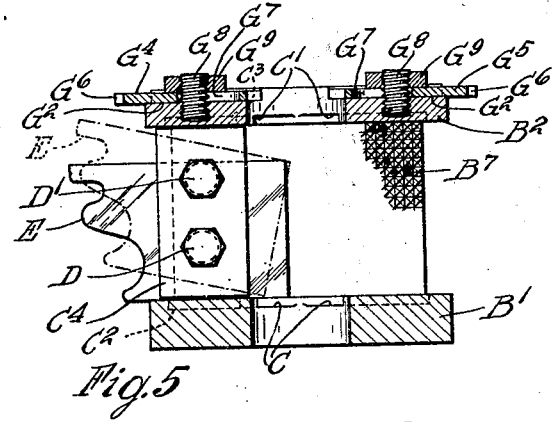
Figure 5 is a section on the line 5—5 of Figure 3.
Figure 3:
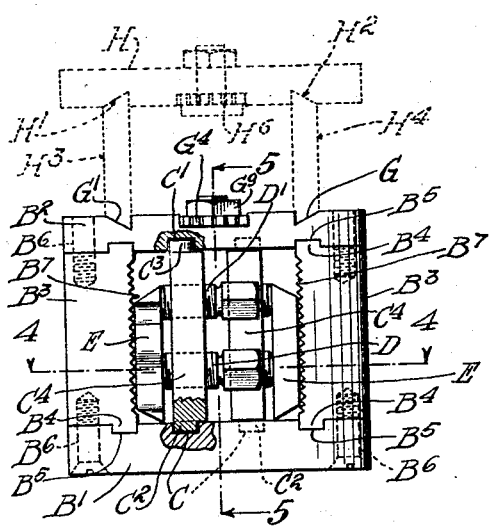
Figure 3 is a side view of the head with parts broken away.
Figure 6:
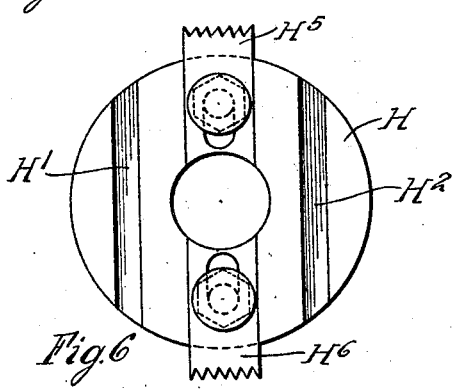
Figure 6 is a bottom plan view of the addition to the head shown in dotted lines in Figure 3.

E, $E^1$ are any suitable identically shaped cutting members adapted to be gripped against the surfaces $B^7$ by action of said screws D, $D^1$. These cutting members or tools are preferably of less width than the space between the plates $B^1$, $B^2$, thus permitting a tilting or angular variation in adjustment, as shown in Figure 5. In addition a radial or rather a tangential adjustment is possible in relation to the shaft B.

The upper face of the plate $B^2$ is penetrated by the angular slots G, $G^1$ and by the flat slots $G^2$ $G^3$. Lying in these flat slots are the cutting blades $G^4$ $G^5$ terminating for example in teeth $G^6$. They are slotted as at $G^7$ to permit radial adjustment and may be held in position, when adjusted, for example by the studs $G^8$ and the hexagon nuts $G^9$.

It is possible, if desired, to superpose upon the plate $B^2$ a third plate H having angular slots $H^1$ $H^2$ opposed to the slots G, $G^1$ of the plate $B^2$. These slots serve to grip the edges of additional cutters $H^3$ $H^4$. It will be understood that the cutters all may be provided with bevelled sides to engage such grooves. The plate H may also be provided with additional rabbet cutting members $H^5$, $H^6$, identical with those above described.

It will be realized that whereas we have shown a practical and operative device that nevertheless many changes may be made in size, shape, number and disposition of parts without departing from the spirit of our invention, and that we wish our description and drawings to be taken as in a broad sense illustrative rather than as limiting us to our specific disclosure.

The use and operation of our invention are as follows:

In cutting mouldings we employ a rotary cutter having for example an opposed pair of identical cutting blades. The head rotates at high speed and as the moulding stock passes along the guide $A^1$ upon the bed A the rapid rotation of the blades cuts the moulding into a cross section conforming to the edges of the knife blades or cutters. The opposed cutters are of course identically adjusted. We provide a peculiarly flexible adjustment since we can not only vary the thickness of the moulding by longitudinally adjusting the cutters, but also vary the angle of the moulding by tilting the cutters, as shown in dotted line in Figure 5. We may at the same time operate upon the moulding stock with the rabbet cutters $G^4$ $G^5$ and may adjust the depth of the rabbet cut by radially adjusting the cutters.

Where we wish to cut a particularly broad moulding we may superpose on the same shaft a pair of units such as the one we describe or, where angular adjustment of the additional cutters is not necessary, we may employ a supplemental holding plate to grip a plurality of cutters between it and the top of the plate $B^2$. In such case we may still angularly adjust the lower cutters. We may of course provide rabbet cutting plates on the additional plate or plates, the blades on the individual plates being of course independently adjustable. It will be obvious from the foregoing that our cutter is adapted to an extremely wide range of adjustment and that without regrinding or reshaping the cutters we may cut a wide variety of mouldings.

We claim:

1. A cutting head comprising, in association with a rotary shaft, a plurality of plates spaced along said shaft, spacing members between said plates, cutting members and means for clamping them against said spacing members, including carriers adapted to be moved from side to side of the head, along planes parallel with the opposed faces of said spacing members.

2. A cutter head comprising a pair of plates adapted to be secured to a rotating shaft, spacing members uniting the said plates so as to form therewith a rigid structure, the spacing members having parallel faces which are spaced apart and on opposite sides of the shaft carrying the cutter head, rigid clamp blocks located in the space between the faces of the spacing members opposite to which they stand, cutting members of a width sufficiently less than the distance between plates to permit angular adjustment thereof, and means carried by the clamp blocks for holding the cutting members securely against the faces of the spacing members in the positions to which they may be adjusted, the holding means for the cutting members being located within the space between the plates and the parallel faces of the spacing members.

3. A cutter head such as described in claim 2 wherein the means for holding the cutting members consist of set screws passing through the clamp blocks.

4. A cutter head such as described in claim 2 in which the clamp blocks are supported so as to be each movable from a position on one side of the supporting shaft to a position on the opposite side, thereby permitting the cutters to be securely supported for operation in whichever direction the supporting shaft may be turned.

Signed at Chicago, county of Cook and State of Illinois, this 18th day of September, 1925.

WILLIAM E. GLATT.

Signed at Chicago, county of Cook and State of Illinois, this 18th day of September, 1925.

ERNST HERMANN.